(12) United States Patent
Fillman

(10) Patent No.: US 6,379,763 B1
(45) Date of Patent: Apr. 30, 2002

(54) ATTACHMENT FITTING FOR COMPOSITE MATERIAL STRUCTURES

(75) Inventor: Gregory L. Fillman, Renton, WA (US)

(73) Assignee: Nova Composites, Inc., Mukilteo, WA (US)

( * ) Notice: Subject to any disclaimer, the term of this patent is extended or adjusted under 35 U.S.C. 154(b) by 0 days.

(21) Appl. No.: 09/378,563

(22) Filed: Aug. 19, 1999

Related U.S. Application Data

(60) Provisional application No. 60/097,146, filed on Aug. 19, 1998.

(51) Int. Cl.[7] .............................. B32B 5/12; F16L 9/06
(52) U.S. Cl. ................. 428/36.9; 428/36.3; 428/36.91; 138/121; 138/122; 138/125; 138/153
(58) Field of Search ............................... 428/36.3, 35.7, 428/36.91, 36.9; 156/169; 29/460; 138/121, 122, 125, 153

(56) References Cited

U.S. PATENT DOCUMENTS

| | | | |
|---|---|---|---|
| 3,739,457 A | 6/1973 | Davis | 29/460 |
| 4,469,730 A * | 9/1984 | Burhans | 428/36 |
| 5,160,392 A * | 11/1992 | Thongs, Jr. | 156/172 |
| 5,944,441 A | 8/1999 | Schuetze | 403/403 |

* cited by examiner

Primary Examiner—Shrive P. Beck
Assistant Examiner—Elena Tsoy
(74) Attorney, Agent, or Firm—Todd N. Hathaway

(57) ABSTRACT

A load bearing attachment fitting for a composite material structure. The fitting includes an elongate body having a plurality of undulations formed along its longitudinal sides. The undulations engage the fibers in the fiber-resin matrix so as to transmit loads from the fitting into the body of the structure. To form the connection between the fitting and the composite material structure, longitudinal strips of fiber-resin tape are laid over the fitting and an adjacent form which defines the body of the structure. Crosswise fibers are then wound over the longitudinal tape to force and hold the longitudinal fibers in conformity with the undulations along the fitting, so that the longitudinal fibers transmit loads from the fitting into the composite material structure. A fluidizable form may be used to form the body of the structure, and after curing the forms may be removed by washing this out through a threaded bore in the attachment fitting. The threaded bore then provides a mounting point for attaching the assembly to other structures in load bearing engagement.

10 Claims, 4 Drawing Sheets

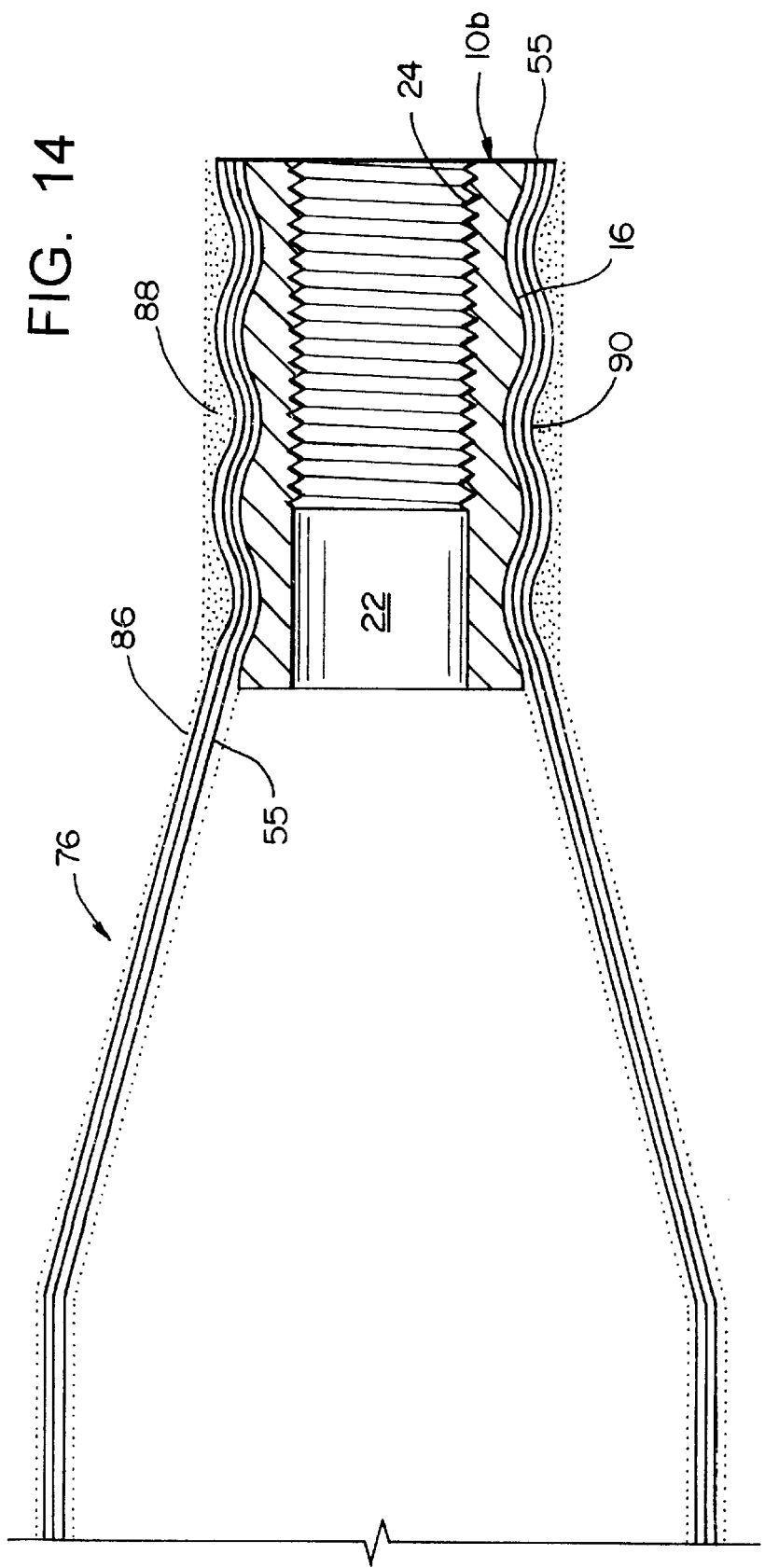

ATTACHMENT FITTING FOR COMPOSITE MATERIAL STRUCTURES

This Appln claims benefit of Prov. No. 60/097,146 filed Aug. 19, 1998.

BACKGROUND a. Field of the Invention

The present invention relates generally to composite material structures, and, more particularly, to an attachment fitting at which generally axial loads are transmitted into such a composite material structure.

b. Related Art

Composite materials are used in the manufacture of a wide variety of structures, especially where a high strength-to-weight ratio is desired. As is known to those skilled in the art, and as is used in this description, composite materials (or simply "composites") are materials in which fibers (usually formed of a high tensile strength material) are imbedded in a resin matrix. Well known examples of composite materials include glass fiber-resin composites and graphite fiber-resin composites, the latter being particularly noted for high strength and light weight. Such materials are available from a large number of manufacturers, one example being Hexcel Corporation of Pleasanton, Calif., USA.

In recent years, composite materials have found increasing use in comparatively large, high-load applications, notably in air frames and orbital satellites, where minimization of weight is a critical consideration. In these applications, the composite material structures are ordinarily bolted or otherwise mounted in load-bearing attachment to one or more other components or structures, such as to struts, panels, rods, bars, brackets and so on, and an attachment fitting of some type is included in the composite material structure for this purpose. In order to provide a precise, durable attachment point, such fittings are ordinarily made of metal, with a socket or pin for attachment of the other member.

Since the attachment fitting is normally formed of metal, a common problem arises as to how to mount the fitting to the fiber-resin material of the composite structure. In some instances, an adhesive has been employed for this purpose, but to form a strong bond requires expensive types of adhesives which are difficult and time-consuming to work with, and the adhesive joint almost invariably represents a weak spot. In other instances, flanges may be formed on the inner and outer ends of the fitting to engage the surfaces of the composite material structure; this results in an excessively heavy fitting, which negates the purpose of using a composite material in the first place, and moreover the transfer/distribution of the loads into the composite material structure is less than ideal.

Accordingly, there exists a need for an attachment fitting for composite material structures which is light in weight and which can be mounted to such structures without forming a weak point. Furthermore, there exists a need for such an attachment fitting which can be efficiently mounted to such a structure without requiring adhesives or the like to form the joint between the two. Still further, there exists a need for such a fitting which will transfer generally axial loads into the composite material structure in an efficient and evenly distributed manner, so as to obtain the full benefit of the load carrying capacity offered by the composite material. Still further, there exists a need for a method for mounting such an attachment fitting to a composite material structure in an efficient and inexpensive manner.

SUMMARY OF THE INVENTION

The present invention has solved the problems cited above, and is a load-bearing attachment fitting for use in composite material structures, and a method for use of the same.

The attachment fitting is an elongate member having a series of generally sinusoidal undulations along its longitudinal sides, and a mounting portion attaching the fitting to an external structure. The ridges and grooves of the sinusoidal surface are configured for load-bearing engagement of a surrounding fiber-resin matrix.

The elongate member of the attachment fitting may be a generally cylindrical member, and the sinusoidal undulations may form a series of generally annular ridges and grooves along the cylindrical member. The means for mounting the fitting to an adjacent structure may be a generally axial bore through the fitting, and the bore may have internal threads over at least a portion thereof.

The composite material structure may be an elongate strut having first and second attachment fittings mounted in axial alignment at opposite ends of the strut.

In accordance with the method of the present invention, a composite material structure is fabricated by mounting the attachment fitting adjacent an internal form member and laying at least one fiber-resin layer over the fitting and form member so that the fitting and form member are joined thereby, and so that at least a portion of the fibers in the fiber-resin layer engage the sinusoidal ridges and grooves of the attachment fitting.

The at least one fiber-resin layer may be at least one lengthwise fiber layer in which the fibers thereof extend in a direction generally parallel to generally axial loads which are applied to the attachment fitting. The at least one lengthwise fiber-resin layer may be overlain with at least one crosswise fiber layer in which the fibers extend generally circumferentially around the attachment fitting so as to retain the lengthwise fibers therein.

The lengthwise fiber-resin layer may comprise at least one strip of fiber-resin tape which is placed over the fitting and form, and the crosswise fiber-resin layer may comprise fiber which is wound over the fitting and the lengthwise fibers.

The form may comprise a fluidizable plaster mandrel. After casting, the plaster mandrel may be removed by washing this out through the threaded bore in the attachment fitting. dr

BRIEF DESCRIPTION OF THE DRAWINGS

FIG. 6 is an elevational view, similar to FIG. 5, showing conical mandrel pieces having been placed at the ends of the main cylindrical mandrel, and also showing the attachment fittings of the present invention having been placed against the outer ends of the conical end pieces and secured in place by removable collars;

FIG. 7 is an elevational view of the assembly of FIG. 6, showing the manner in which a first fiber layer is formed by helical winding of fiber material thereon;

FIG. 8 is an elevational view, partly in cross-section, showing the formation of one or more axially aligned fiber layers by placement of a series of longitudinal fiber-resin strips over the assembly;

FIG. 9 is an elevational view showing the formation of an outer fiber layer in which the fiber material is again wound onto the assembly, with the helically-wound fibers serving to hold the axial fibers in conformity with the sinusoidal surfaces of the attachment fittings at the ends of the assembly;

FIG. 10 is an elevational view of the assembly of FIG. 11, showing an outer layer of removable tape being wound thereon for retaining the fiber layers in position during subsequent heating and curing of the materials;

FIG. 11 is a cross-sectional view showing the exemplary composite material strut which has been constructed in FIGS. 5–10 being cured at an elevated temperature in an autoclave;

FIG. 12 is an elevational view of the assembly of FIG. 10, showing the outer tape layer being removed after the fiber-resin layers have been cured to form a rigid strut member;

FIG. 13 is an elevational view of the strut member of FIG. 11, showing the removal of the internal mandrel by washing this out with a flow of water or other fluid; and FIG. 14 is a partial, cross-sectional view of an end portion of the finished strut of FIG. 13, showing the manner in which the series of cured fiber-resin layers engage the sinusoidal exterior of the attachment fitting so as to retain the fitting in the composite material structure and effect the transfer of loads thereto.

DETAILED DESCRIPTION

Figure 1:
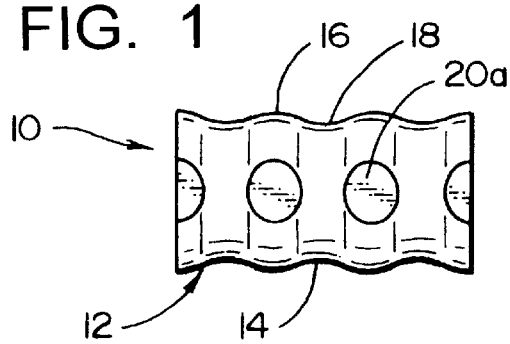
FIG. 1 is an elevational view of an attachment fitting in accordance with the present invention, showing the generally sinusoidal contour of the longitudinal sides thereof.
Figure 2:
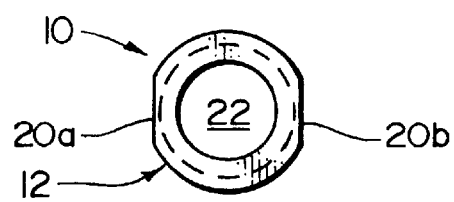
FIG. 2 is an end view of the attachment fitting of FIG. 1, showing the generally cylindrical configuration of the fitting, and the flats along the sides thereof which prevent the fitting from turning within the composite material body.
Figure 3:
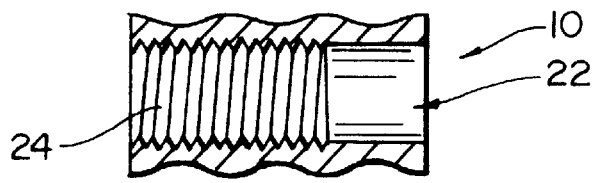
FIG. 3 is an elevational view of a longitudinal cross-section taken through the attachment fitting of FIG. 1, showing the internally threaded bore thereof.

FIG. 1 shows an attachment fitting 10 in accordance with the present invention. As will be described in greater detail below, the attachment fitting is mounted at a predetermined location within a composite material structure so as to transfer generally axial loads to the fiber/resin structure thereof.

As can be seen in FIG. 1, the attachment fitting 10 includes a generally cylindrical body 12 formed of a suitable metal, such as titanium, for example, and having a sinusoidal external surface 14 which defines a plurality of alternating crests and grooves 16, 18. As is used herein, the term "sinusoidal" is not limited to those curves which are defined precisely by a sine function, but includes all generally similar, undulating surface configurations having a series of alternating, generally annular crests and grooves. Each annular ridge preferably has first and second flats 20a, 20b on generally opposite sides thereof, so that a series of flats extends along each side of the cylindrical body so as to prevent the fitting from turning within the fiber-resin matrix when torque is applied thereto.

The fitting 10 also includes an axial bore 22 having internal threads 24 over at least a part of its length. The threaded bore is configured to receive the end of a bolt or threaded rod for attachment to another component, such as another strut or a panel, for example. In some embodiments, the fitting may have an axially extending stud, with or without threads, or other form of coupling in addition to or in place of the threads in the bore for attachment to the adjacent component. Moreover, in some embodiments the attachment fitting may be formed of a non-metallic material, such as high-strength plastic or ceramic material, for example.

As is shown in FIG. 14, and as will be described in greater detail below, the generally cylindrical attachment fitting is embedded in the structure so that the annular ridges/grooves are engaged by the surrounding fiber-resin matrix. This forms an extremely strong engagement between the metallic and composite components without requiring an adhesive, and also ensures effective transfer of axial loads into the composite material.

Figure 4:
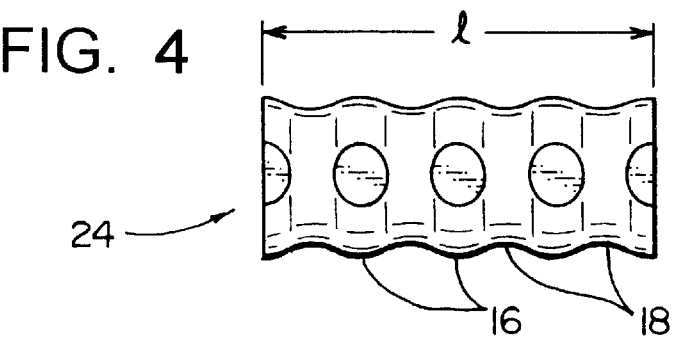
FIG. 4 is an elevational view of a second attachment fitting which is generally similar to that which is shown in FIG. 1, but which is somewhat longer for increased load bearing capacity.
Figure 5:
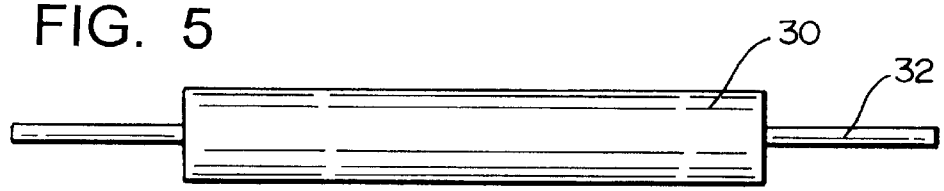
FIGS. 5–13 are a series of views showing the sequential steps in the formation of a fiber-resin composite structure having an attachment fitting in accordance with the present invention, FIG. 5 being an elevational view of a generally cylindrical mandrel over which an exemplary composite material strut is formed in accordance with the method of the present invention.

Moreover, for greater or lesser axial loads, the length "1" can be increased or decreased without necessarily changing the diameter of the cylindrical body. For example, the attachment fitting 24 which is shown in FIG. 4 has the same overall configuration as the fitting 10 in FIG. 1, except that its increased length provides it with one more set of ridges grooves 16, 18 with which to engage the surrounding fiber-resin matrix, thereby providing greater resistance to displacement by axial loads.

As will also be described in greater detail below, during fabrication of the structure the fiber-resin layers are pressed into engagement with the cylindrical fitting so that the longitudinal fibers closely follow the ridges/grooves thereon. In this respect, the smooth, generally sinusoidal undulations of the fitting have been found to have the great advantage of allowing a close interfit, without forcing the fibers to bend through excessively sharp angles which could cause a breakage or reduction of strength. Although the actual height and width of the ridges and grooves will vary somewhat according to the qualities of the materials used in the fiber-resin matrix and the design requirements of the structure (e.g., larger structures will generally require larger ridges/grooves, due in part to the larger number of fiber/resin layers used to form the walls of such structures), a somewhat shallow sinusoidal curve is generally preferred, with a curve having an approximate 8:1 width-to-height ratio being eminently suitable for use with commonly available carbon fiber-resin materials such as those which are described below.

FIGS. 5–13 illustrate the sequential steps in the construction of an exemplary composite material strut using the axial load attachment fittings of the present invention. In this example, the strut is an elongate structure having first and second identical, axially aligned attachment fittings at each end, through which loads are transmitted to one or both ends of the strut. It will be understood, however, that the attachment fittings and methods disclosed herein may be used with other suitable forms of load bearing composite material structures, such as beams, brackets, panels and tubes, to give just a few examples. Moreover, it will be understood that while the exemplary embodiment which is shown in the figures employs a carbon fiber-resin matrix material, the present invention is not so limited, and may be used with other suitable types of fibers and resin materials, such as glass, Kevlar, UHMWPE or liquid crystal fibers, for example.

As the first step in the fabrication of an exemplary strut in accordance with the present invention, a primary internal form or mandrel member 30 having a cylindrical or other suitable shape is fitted over a support shaft 32 which extends axially beyond both ends of the member. The mandrel member is formed of a suitable fluidizable material (such as a fluidizable plaster, for example) which can be subsequently removed by fluidizing and washing this out of the interior of the finished article, as will be described in greater detail below.

First and second generally conically tapered mandrel end pieces 34a, 34b are placed on rod 32 so that these abut the ends of the main mandrel member 30 and form a smooth outward taper; rather than using separate conical pieces, the tapers can be formed by machining the ends of the cylindrical main mandrel member 30, or the main mandrel member may be cast or otherwise initially formed with the desired taper. For most axial/compressive loading applications the taper is preferably about 5° or less, so as to minimize development of outwardly directed bending or buckling forces in the area where the fibers transition from the conical taper into the cylindrical well of the strut.

The first and second attachment fittings 10a, 10b are then slid over the support rod and against the outer ends of the conical end pieces. The support rod 32 has a diameter which is sized to cooperate with the internal bores of the attachment fittings and mandrel pieces so as to stabilize these in axial alignment for the subsequent molding steps.

Figure 6:
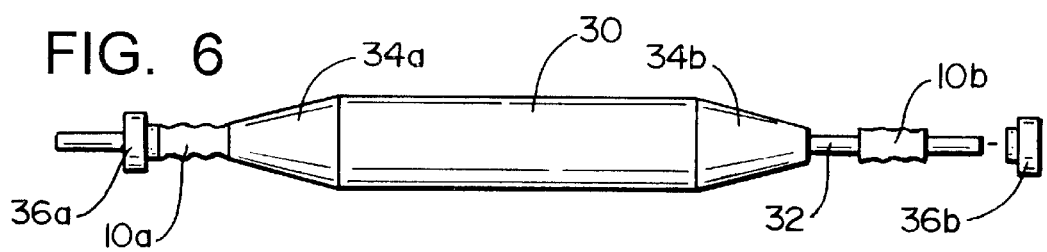

Finally, as can also be seen in FIG. 6, first and second end collars 36a, 36b are slid over the rod member and are pressed against the outer end of the attachment fittings so as to force the pieces of the assembly together. The end collars are then locked in place against the shaft 32 using a set screw (not shown) or other suitable mechanism.

Figure 7:
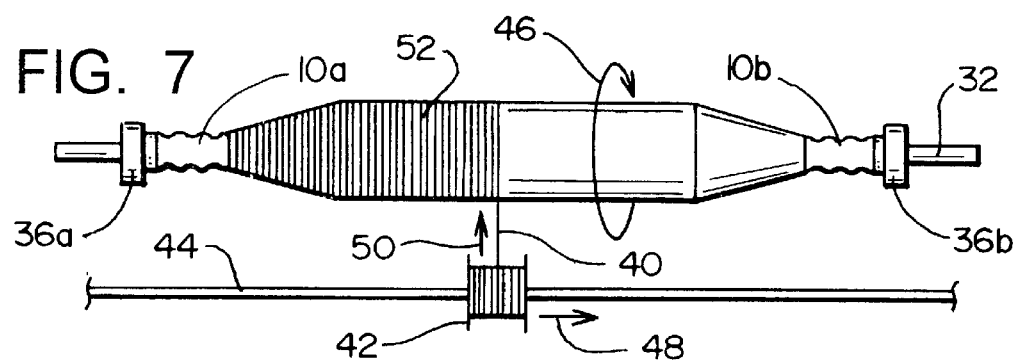

After the mandrel assembly has been secured on the support rod 32, a first, base layer of carbon fiber thread 40 is wound onto the mandrel pieces; since the fibers in this layer extend generally crosswise or perpendicular to the long axis of the assembly, this is referred to as a first "90°" layer, although the fibers will not always be at this exact angle. As is shown in FIG. 7, the fiber thread 40 is wound onto the surface of the plaster mandrel assembly from a spool 42 which is supported for rotation on a shaft 44 which extends adjacent and parallel to the main support shaft 32. Thus, as the mandrel assembly is rotated in the direction indicated by arrow 46 in FIG. 7 and the spool 42 is moved longitudinally along the secondary shaft 44, in the direction indicated by arrow 48, the fiber thread is fed off of the spool and wound along a generally helical path about the form, as indicated by arrow 50. This first 90° fiber layer 52 extends from the base of the first attachment fitting 10a to the base of the second fitting 10b, but preferably does not extend over the sinusoidal outer surfaces of the fittings themselves.

After the 90° fiber base layer has been laid down on the mandrel assembly, this is covered with a series of strips 54 formed of "prepreg" graphite fiber-resin tape. The "prepreg" tape material can be formed in comparatively narrow strips, and includes a multiplicity of graphite fibers which run generally parallel to one another and which are embedded in a resin material which is soft and easily moldable as originally supplied, but which becomes fluid when heated and then cures to form a hardened matrix. The fibers in the tape layers extend generally lengthwise or longitudinally over the fitting and form and are referred to as "0°" fibers, although again it will be understood that they may not follow this exact angle, and in some embodiments the lengthwise fibers may extend at angles on the order of 45° or more.

Suitable prepreg tape materials are typically about 5–6 thousandths of an inch thick and are available from a number of suppliers of composite material products, including Hexcel Corporation (see above). Moreover, a "prepreg" yarn made up of a bundle of fibers may be used in place of plain carbon thread for the 90° windings, which has the advantage of ease of use and added bonding to the 0° "prepreg" type material; for example, a suitable "prepreg" yarn having a diameter of about ⅛ inch is available as "towpreg" material from the Hexcel company noted above.

Figure 8:
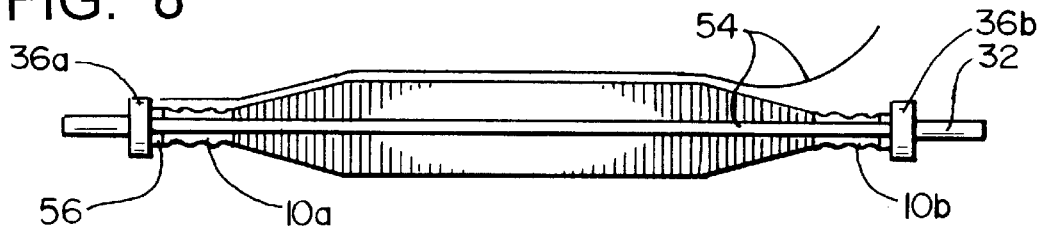

As can be seen in FIG. 8, the strips of prepreg tape are laid down generally parallel to the long axis of the assembly and in generally edge-to-edge relationship, so as to form a 0° degree fiber layer which completely encases the assembly. As can also be seen in FIG. 8, the 0° fiber layer (unlike the underlying 90° layer) extends beyond the ends of the mandrel pieces and out over the sinusoidal surfaces of the attachment fittings; the terminal ends of the strips overlap bosses 56 on the collar members 36a, 36b, so that any unevenness amongst the ends of the strips can be removed by trimming the structure flat with the end faces of the attachment fittings after curing.

The prepreg graphite-resin tape material is applied to form a predetermined number of 0° fiber layers, depending on the type of material used and the design strength of the finished strut or other structure: In the case of the exemplary strut which is shown in the figures, the number of 0° fiber layers may suitably be in the range from about 3 to about 15 or more.

Figure 9:
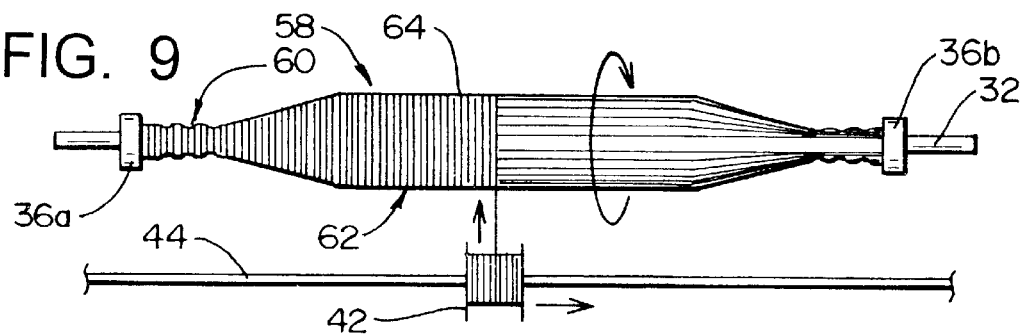

The 0° layers form the main load-bearing component of the structure. After these have been placed on the layup assembly, another layer of 90° fibers is wound onto the assembly, as can be seen in FIG. 9. The purpose of this outer 90° layer 58 is to retain the 0° layers against spreading, and also to force and hold the 0° layers in the sinusoidal grooves of the end fittings. To do this, a plurality (e.g., 4–10) layers of the 90° fibers are installed over the end fittings, in the area 60 in FIG. 9, although a single outer 90° layer is typically sufficient for the main body 62 of the structure. Moreover, in some embodiments the layup assembly may be shrink wrapped repeatedly (not shown) to force the 0° fiber-resin layers into the proper shape and into conformity with the end fittings, before application of the 90° windings 64.

In some embodiments the fiber-resin walls of the structure may be relatively thick, especially where the structure itself is comparatively large. For example, the tubular wall of a foot long strut having the general configuration which is shown in the drawings (and which has an axial load strength of about 200,000 pounds) may require on the order of 35 layers of 0° fiber-resin "prepreg" material. In these cases, a 90° winding is preferably applied for every few (e.g., five) 0° layers, with subsequent layers being applied over the top of this.

Figure 10:
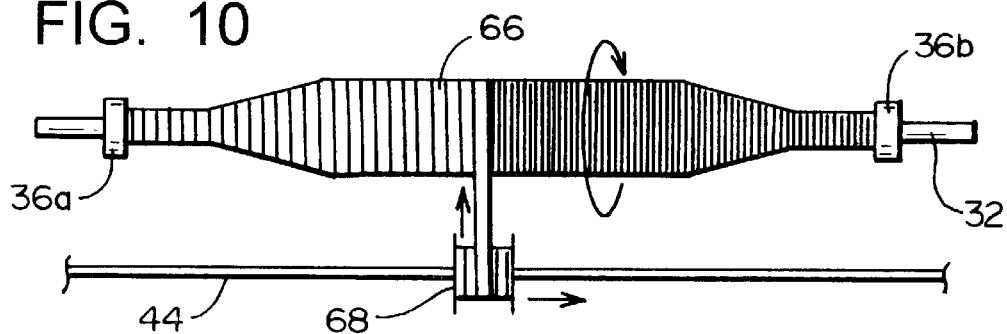

After the outer 90° windings have been completed, a release film (not shown) is applied to the exterior of the layup assembly, and the assembly is then wound with shrink tape 66 from a second spool 68, as is shown in FIG. 10. The shrink wrap tape may be applied in one or more layers, and serves to retain the fluid resin from escaping during the subsequent heating and curing steps. Preferably, the width of the heat shrink tape is equal to or somewhat greater than the annular channels on the exterior of the 90° windings over the attachment fittings, so as to ensure even filling of these areas during the subsequent heating and curing steps.

Figure 11:
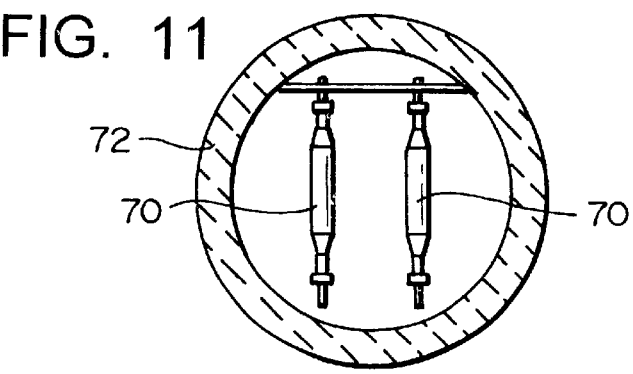

The completed layup assemblies 70 are placed in an autoclave 72 or other suitable heating apparatus for heating/curing of the resin material. As can be seen in FIG. 11, the layup assemblies are preferably heated and cured in a vertical orientation (i.e., with the long axis extending in a vertical direction), so as to minimize sagging of the material and to insure a more uniform finished cross-section. Heating is performed at temperature and time parameters which are specified by the manufacturer of the prepreg fiber-resin tape material. While heated, the resin component of the 0° prepreg tape layers becomes molten and permeates the adjoining 90° fiber windings, with the outer layer of shrink wrap tape maintaining the exterior configuration and preventing escape of the resin in its fluid state.

Figure 12:
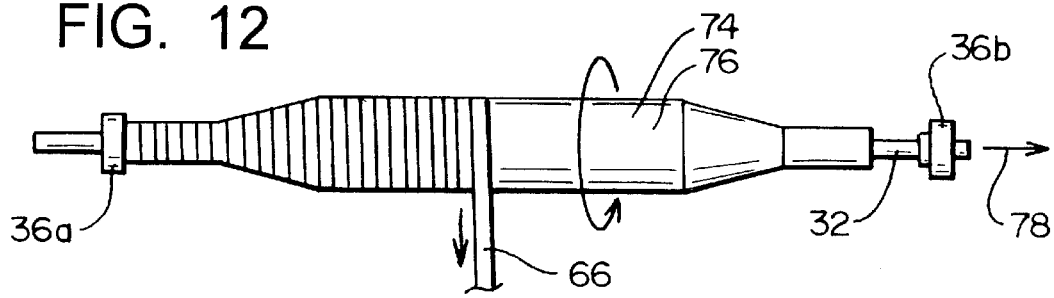
Figure 13:
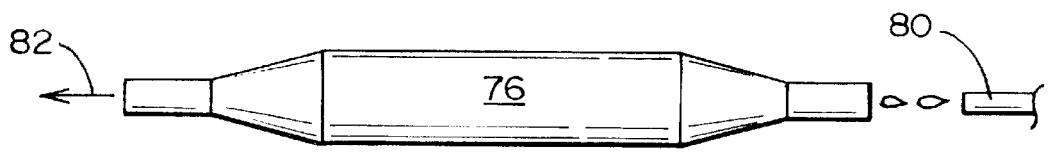

After a predetermined period of heating and subsequent cooling, the resin component cures to form a permanently rigid matrix. The shrink wrap tape 66 is then unwound and the release film is removed, as shown in FIG. 12, leaving the smooth external surface 74 of the cured strut 76. Collar members 36a, 36b are then detached from the shaft and removed, and the shaft 32 is driven out of the layup assembly in the direction indicated by arrow 78. A jet or flow of water 80 or other suitable liquid is then directed through the hollow core which is left by removal of the central rod 32, so as to fluidize the plaster mandrel members (not shown in FIG. 13). The fluidized material is flushed out from the interior of the strut 76 and discharged through the bore of the attachment fitting 10a at the opposite end, as indicated by arrow 82. The ends of the composite layers are then trimmed flush with the end faces of the attachment fittings.

FIG. 14 is a cross-sectional view of one end of the finished strut 76, primarily showing the relationship between the 0° (axial) fiber layers 55 and the sinusoidal external surface 16 of the attachment fitting 10b. As can be seen, the resin component, when molten, permeates the fiber structure and wells out between the outer 90° fibers and the heat shrink tape to form a smooth, generally continuous outer shell 86 which fully encapsulates the fiber layers. In the area over the attachment fittings in particular, the resin layer forms a hardened casing 88 which fills in the annular channels 90 on the outside of the fibers, thereby preventing the latter from spreading or sliding out of engagement with the corresponding ridges/grooves of the metallic fitting. As was noted above, the series of flats 20a, 20b along the sides of the fitting, in turn, prevent the fitting from turning within the composite material structure under application of torque. Moreover, because the 0° fibers are in direct engagement with the attachment fitting (as noted above, the inner 90° winding does not extend onto the fitting itself), axial loads are transmitted directly and efficiently into the load carrying axial fibers 55 of the structure.

It is to be recognized that various alterations, modifications, and/or additions may be introduced into the constructions and arrangements of parts described above without departing from the spirit or ambit of the present invention.

What is claimed is:

1. A composite material structure, comprising:
   a fiber-resin matrix; and
   a load-bearing attachment fitting, comprising:
      an elongate body member having a mounting portion for attachment to an external structure, and a plurality of smooth edged, substantially sinusoidal undulations formed along a longitudinal side of said body member for engaging said fiber-resin matrix of said composite material structure;
      at least one layer of lengthwise fibers which extend longitudinally over said attachment fitting so as to transmit loads from said fitting; and
      at least one layer of crosswise fibers which extend around said attachment fitting so as to hold said lengthwise fibers in engagement with said undulations along said attachment fitting.

2. The composite material structure of claim 1, wherein said elongate body member comprises:
   an elongate, cylindrical body member having first and second ends.

3. The composite material structure of claim 2, wherein said plurality of substantially sinusoidal undulations comprises:
   a plurality of annular ridges and grooves which extend around said cylindrical body member.

4. The composite material structure of claim 2, wherein said mounting portion of said attachment fitting comprises:
   means for threadingly mounting said attachment fitting to said external structure so that loads are transferred from said external structure to said attachment fitting in a axial direction.

5. The composite material structure of claim 4, wherein said composite material structure comprises:
   an elongate strut having first and second said attachment fittings mounted at opposite ends of said strut in coaxial alignment.

6. The composite material structure of claim 4, wherein said load-bearing attachment further comprises:
   at least one flat formed on said longitudinal side of said cylindrical body member for engaging said fiber-resin matrix so as to prevent said body member from turning therein in response to application of torque to said body member.

7. A composite material structure, comprising:
   a load-bearing attachment fitting, comprising:
      an elongate, cylindrical body member, said body member having:
         a threaded axial bore for mounting said attachment fitting to an external structure so that loads are transferred from said transmit from said external structure to said attachment fitting in an axial direction;
         a plurality of alternating annular ridges and grooves that form smooth edged, substantially sinusoidal undulations formed along an outside of said cylindrical body member; and
         at least one flat formed on said ridges on said outside of said body member; and
      a fiber-resin matrix comprising:
         at least one layer of lengthwise fibers which extend substantially longitudinally over said attachment fitting, and
         at least one layer of crosswise fibers which extend substantially around said attachment fitting on top of said layer of lengthwise fibers;
      so that said at least one layer of lengthwise fibers engages said undulations so as to transmit said axial loads from said attachment fitting and said at least one layer of crosswise fibers hold said lengthwise fibers in engagement with said undulations on said fitting, and so that said flat on said undulations engages said fiber-resin matrix so as to prevent said attachment fitting from turning therein in response to application of torque to said fitting.

8. The composite material structure of claim 7, wherein said at least one flat comprises:
   first and second longitudinally extending rows of flats formed on opposite sides of said cylindrical body member.

9. The composite material structure of claim 7, wherein said at least one layer of lengthwise fibers comprises at least one layer of carbon fiber-resin material.

10. The composite material structure of claim 9, wherein said alternating ridges and valleys follow a sinusoidal curve having a width-to-height ratio of approximately 8:1.

* * * * *